US010033757B2

(12) United States Patent
Hodgman et al.

(10) Patent No.: US 10,033,757 B2
(45) Date of Patent: Jul. 24, 2018

(54) IDENTIFYING MALICIOUS IDENTIFIERS

(71) Applicant: Rapid7, Inc., Boston, MA (US)

(72) Inventors: Roy Hodgman, Cambridge, MA (US); Aditya Kuppa, Belfast (IE); Suchin Gururangan, Somerville, MA (US); Andrew Reece, Los Altos, CA (US)

(73) Assignee: Rapid7, Inc., Boston, MA (US)

( * ) Notice: Subject to any disclaimer, the term of this patent is extended or adjusted under 35 U.S.C. 154(b) by 78 days.

(21) Appl. No.: 15/177,555

(22) Filed: Jun. 9, 2016

(65) Prior Publication Data

US 2017/0359368 A1      Dec. 14, 2017

(51) Int. Cl.
*H04L 29/06*            (2006.01)
(52) U.S. Cl.
CPC ........ *H04L 63/1441* (2013.01); *H04L 63/101* (2013.01); *H04L 63/145* (2013.01); *H04L 63/1425* (2013.01)

(58) Field of Classification Search
CPC ............... H04L 63/1441; H04L 63/101; H04L 63/1425; H04L 63/145
See application file for complete search history.

(56) References Cited

U.S. PATENT DOCUMENTS

2009/0249484 A1* 10/2009 Howard ................ G06F 21/567
                                                           726/24
2015/0007312 A1*  1/2015 Pidathala .............. H04L 63/145
                                                           726/22

* cited by examiner

*Primary Examiner* — Ghodrat Jamshidi
(74) *Attorney, Agent, or Firm* — Danielson Legal LLC

(57) ABSTRACT

Methods and systems for identifying malicious URIs. The system accepts a list of URIs as input and extracts features related to a given URI and uses the features to discover patterns that indicate malicious content. Once trained, the classifier can then classify new inputs as either malicious or non-malicious.

24 Claims, 7 Drawing Sheets

| Identifier *n* |
|---|
| *n* text <br> • *n* length <br> • *n* number of vowels <br> • *n* number of consonants <br> • *n* number of special characters <br> • *n* file extension type <br> • *n* number of domain levels <br> • *n* top-level domain |
| *n* header <br> • *n* status code <br> • *n* server hardware <br> • *n* software serving content |
| *n* content <br> • *n* head length <br> • *n* body length <br> • *n* redirect instructions |
| *n* Registration <br> • *n* IP characteristics <br> • *n* Autonomous System Membership |
| *n* blacklist check |

IDENTIFYING MALICIOUS IDENTIFIERS

TECHNICAL FIELD

This invention generally relates to methods and systems for detecting malicious identifiers such as uniform resource identifiers (URIs).

BACKGROUND

Due to its prevalence in today's society, the internet and other types of networks have become a hub for criminal activity. Criminal enterprises and/or actors often attempt to install malware or other harmful software on systems used by unsuspecting users by directing those users to malicious resources identified by uniform resource identifiers (URIs) (e.g., malicious web addresses). Therefore, it would be helpful to users to know which URIs are malicious and which are safe (non-malicious) before accessing those resources.

Current technology primarily uses rule-based filtering to identify malicious URIs. For example, Proofpoint URL Defense checks a URI against a set of blacklists and internet protocol (IP) reputation scores. If a URI is on a blacklist or associated with a questionable domain, it is classified as malicious. However, this technique is static and does not provide flexibility in adapting to threats. Other techniques have been proposed to create predictive models to classify malicious web site URIs based on certain features that are indicative of suspicious URIs.

A need exists, therefore, for methods and systems that classify URIs based on a plurality of diverse features that can be used to classify new URIs.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying malicious resources accessible through a network. The method includes accessing, through an interface to a computer-readable medium, a identifier comprising the location of a network accessible resource; extracting, using a configured processor, textual information concerning the identifier; collecting, using a configured processor, metadata information from communications with the network accessible resource associated with the identifier; collecting, using a configured processor, content from communications with the network accessible resource associated with the identifier; and providing the extracted textual information, collected metadata information, and collected content to a classifier as input and receiving an identification of the identifier as malicious or non-malicious.

In one embodiment, the method further includes training the classifier on sets of known malicious and non-malicious identifiers.

In one embodiment, the identifier is a uniform resource identifier (URI).

In one embodiment, the method further includes collecting, using a network interface, information concerning the presence of the identifier on a blacklist, and providing the collected blacklist presence information to the classifier.

In one embodiment, the method further includes issuing an alert in response to the identification of the identifier as malicious.

In one embodiment, the textual information is at least one of length, number of vowels, number of consonants, number of special characters, file extension type, number of domain levels, and top-level domain.

In one embodiment, the identification of the identifier comprises a score to define a degree of maliciousness of the identifier. In one embodiment, at least one of whether the score is presented to a user based on the degree of maliciousness and how the score is presented to a user is customizable.

In one embodiment, the metadata information is at least one of a status code, the identity of the hardware providing the network accessible resource, and the identity of the software serving the content.

In one embodiment, the content is at least one of head length, body length, and redirect instructions.

In one embodiment, the method further includes collecting, using a configured processor, registration information associated with the identifier In another aspect, embodiments relate to a system for identifying malicious resources accessible through a network. The system includes an interface to a computer-readable medium configured to access a identifier comprising the location of a network-accessible resource; a network interface; a processor in communication with the medium interface and the network interface, the processor configured to: extract textual information concerning the identifier; collect metadata information from communications with the network accessible resource associated with the identifier; collect content from communications with the network accessible resource associated with the identifier; and execute a classifier receiving the extracted textual information, collected metadata information, and collected content as inputs and providing an identification of the identifier as malicious or non-malicious as output.

In one embodiment, the classifier is trained on sets of known malicious and non-malicious identifiers.

In one embodiment, the identifier is a uniform resource identifier (URI).

In one embodiment, the system further includes a network interface configured to collect information concerning the presence of the identifier on a blacklist, and providing the collected blacklist presence information to the classifier.

In one embodiment, the system further includes an alert device to issue an alert in response to the identification of the identifier as malicious.

In one embodiment, the textual information is at least one of length, number of vowels, number of consonants, number of special characters, file extension type, number of domain levels, and top-level domain.

In one embodiment, the identification of the identifier comprises a score to define a degree of maliciousness of the identifier. In one embodiment, at least one of whether the score is presented to a user based on the degree of maliciousness and how the score is presented to a user is customizable.

In one embodiment, the metadata information is at least one of status code, the identity of the hardware providing the network accessible resource, and the identity of the software serving the content.

In one embodiment, the content is at least one of head length, body length, and redirect instructions.

In one embodiment, the processor is further configured to collect registration information associated with the identifier.

In yet another aspect, embodiments relate to a computer readable medium containing computer-executable instructions for performing a method for identifying malicious resources accessible through a network. The medium includes computer-executable instructions for accessing, through an interface to a programmable device, a text for analysis; computer-executable instructions for accessing, through an interface to a computer-readable medium, a identifier comprising the location of a network-accessible resource; computer-executable instructions for extracting, using a configured processor, textual information concerning the identifier; computer-executable instructions for collecting, using a configured processor, metadata information from communications with the network accessible resource associated with the identifier; computer-executable instructions for collecting, using a configured processor, content from communications with the network accessible resource associated with the identifier; and computer-executable instructions for providing the extracted textual information, collected metadata information, and collected content to a classifier as input and receiving an identification of the identifier as malicious or non-malicious.

In one embodiment, the medium further includes computer-executable instructions for training the classifier on sets of known malicious and non-malicious identifiers.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 5 illustrates information related to the identifier of FIG. 3 in accordance with one embodiment;

DETAILED DESCRIPTION

Figure 1:
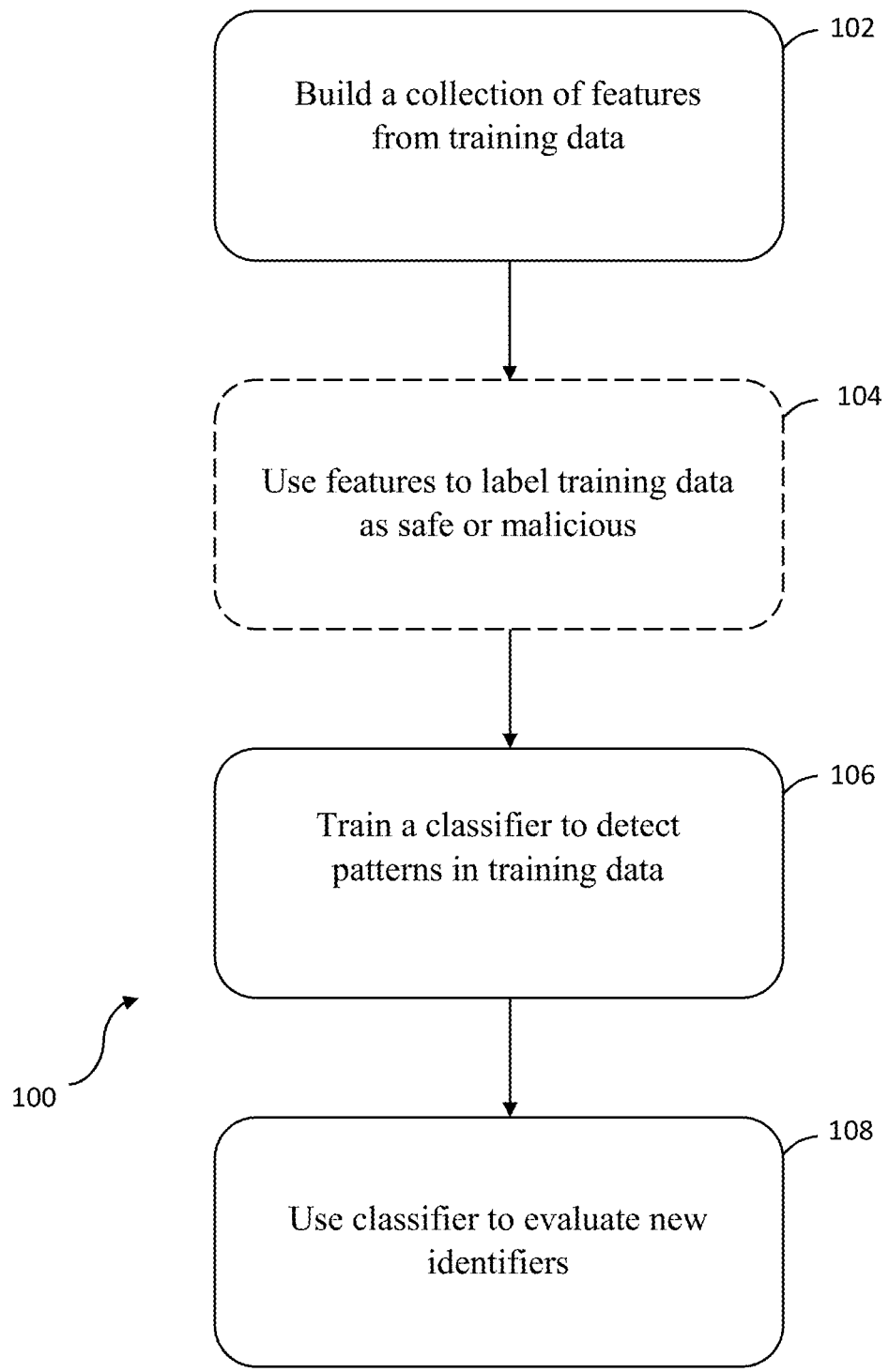
FIG. 1 depicts a flowchart of a method for identifying malicious resources in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In the context of the present application, the term "identifier" may include a location of a network-accessible resource. This identifier may be a URI or a URL (i.e., a uniform resource locator, a URI that includes the address of the resource), for example.

The features of the present invention may be used to detect malicious URIs in email, for example. Features of the invention may also be used to identify email attack vectors. Additionally, the features of the invention may be extended to any form of digital media in which hyperlinks are present and need to be evaluated as potential threats, such as in chat or SMS communications.

Methods and systems of various embodiments of the invention may use malicious or safe links in a training set of URIs to train a machine learning model. The designation of a link as malicious or safe (i.e., non-malicious) may depend on one or more features associated with the URI. The model may weight each feature in relation to all of the other features provided to create a high-dimensional, adaptive threat profile that can then be employed to make accurate classifications of new URIs using new data.

Additionally, this process is repeatable and automatable. Therefore, as attackers change their methods, the model can be trained using new datasets to create new and updated models for further use in identifier classification.

Thus, various embodiments of the present invention use a machine learning model to classify URIs as malicious or non-malicious. This approach begins with a set (or sets) of training data to create the model to make future classifications. The training data may consist of a set of correctly-labeled identifiers (i.e., a list of URIs labeled as either safe or malicious) along with a set of descriptive features about the identifier and the network-accessible resource associated with the identifier. The model may identify probabilistic patterns among the descriptive features that correspond with the safe and malicious labels. Once these patterns have been learned, the model can accept new, unlabeled identifiers, and make an assessment as to the likelihood of each identifier being safe or malicious.

FIG. 1 depicts a flowchart of a method 100 of carrying out this process. As shown, the method includes the steps of building a collection of features from training data 102, optionally using features to label training data as safe or malicious 104, training a classifier to detect patterns in training data 106, and using the classifier to make evaluations of new identifiers 108. Each of these steps are discussed in more detail below.

Figure 2:
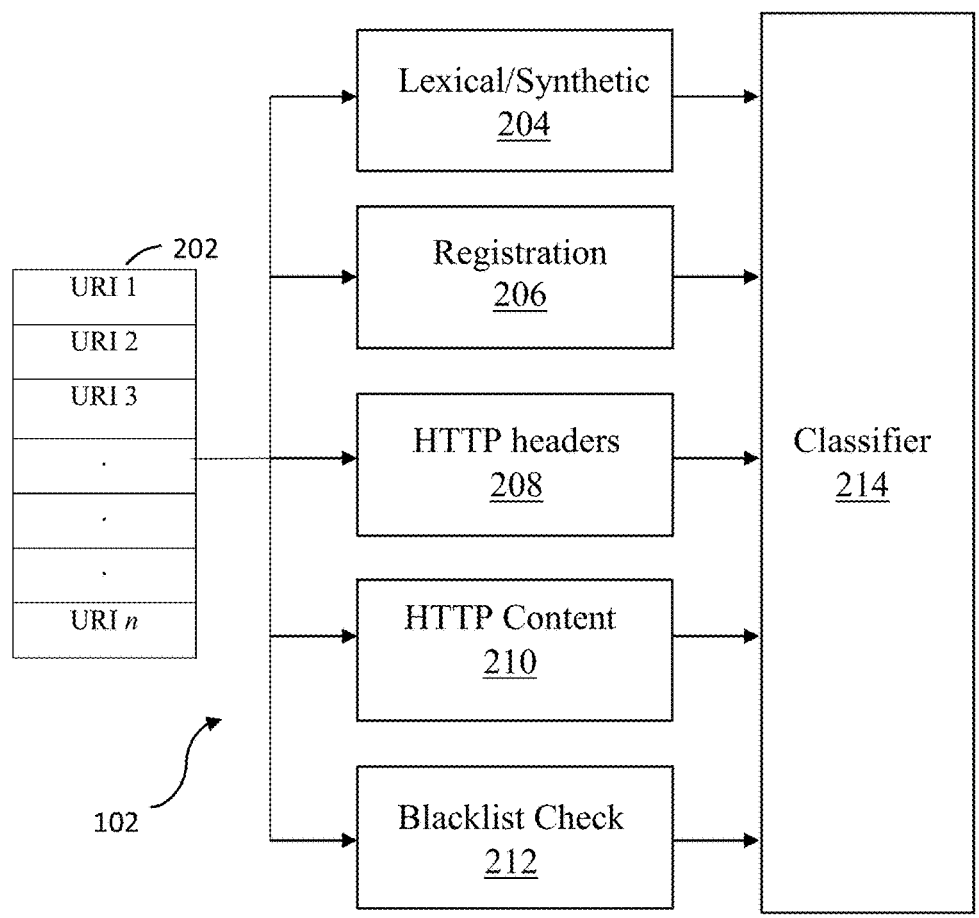
FIG. 2 depicts a flowchart of the step of building a collection of features of FIG. 1 in accordance with one embodiment.

FIG. 2 illustrates the step 102 from FIG. 1 of building a collection of features from training data. This step 102 may apply a series of subroutines to a set of URIs 202 to collect various features. In this embodiment, these features fall into five broad categories: lexical/syntactic features 204; registration information 206; hypertext transfer protocol (HTTP) headers 208; HTTP content features 210; and blacklist checks 212.

The lexical/syntactic features 204 may relate to, for example, the structural characteristics of the URI. Structural characteristics considered may include the number of characters in the identifier, the number of vowels in the identifier, the number of consonants in the identifier, the number of special characters (e.g. #, $, !, ?, @, etc.) in the identifier, the type of file extension, the number of domain levels, the top-level domain, or the like.

The registration information 206 may relate to ASN/DNS data features such as, for example, IP characteristics, Autonomous System membership(s), routing prefixes, routing policies, or the like.

The HTTP header features 208 may relate to operating parameters of an HTTP transaction, and may include data related to server software (Apache, Nginx, etc.) associated with the identifier's associated location and status codes (e.g., "204 No Content", "403 Forbidden", 404 Not Found", etc.) returned when interacting with the server at the location.

The HTTP content features 210 may relate to, for example, head length, body length, <meta http-redirect> tags, obfuscated Javascript®, Javascript redirects, and other types of tags and commands returned in response to an HTTP query served to the network location associated with the identifier under analysis.

The blacklist check 212 may check a URI against a list of known safe and malicious URIs based on some criterion. These may include, but are not limited to, Google® Safe Browse, Virus Total Status, and other domain and URI blacklists.

In embodiments where the training set does not already classify its member identifiers as safe or malicious, then these extracted features, or some combination thereof, may then be used to label each URI in the training set 202 as safe or malicious by a classifier 214 in step 104. Once the training set of safe and malicious URIs has been received or produced, Step 106 of method 100 involves training a classifier to detect patterns in the training data, and is illustrated as method 300 of FIG. 3.

Step 302 of method 300 involves "cleaning" in which missing data is imputed to float values by replacing NAN (not a number) values with medians/modes of respective columns of a data set. The next step 304 involves developing a decision boundary between a set of malicious and non-malicious identifiers of a subset of data. For each data sample, categorical variables may be encoded into vectors by converting them to "dummy values" to indicate the presence of a categorical feature in a data sample (e.g., by one-hot encoding). Method 300 also includes a dimensionality reduction step 306, in which the feature set dimensionality is reduced (e.g., by principal component analysis) to a set of features that spans the most variance of the data.

These features may be organized into a binary tree, and the features selected may be computed based on gini entropy. Gini entropy measures how accurate a given decision boundary would be if the labeled samples were divided into separate groups according to the feature threshold. It follows that an optimal feature threshold is one that has a minimum gini entropy.

Figure 3:
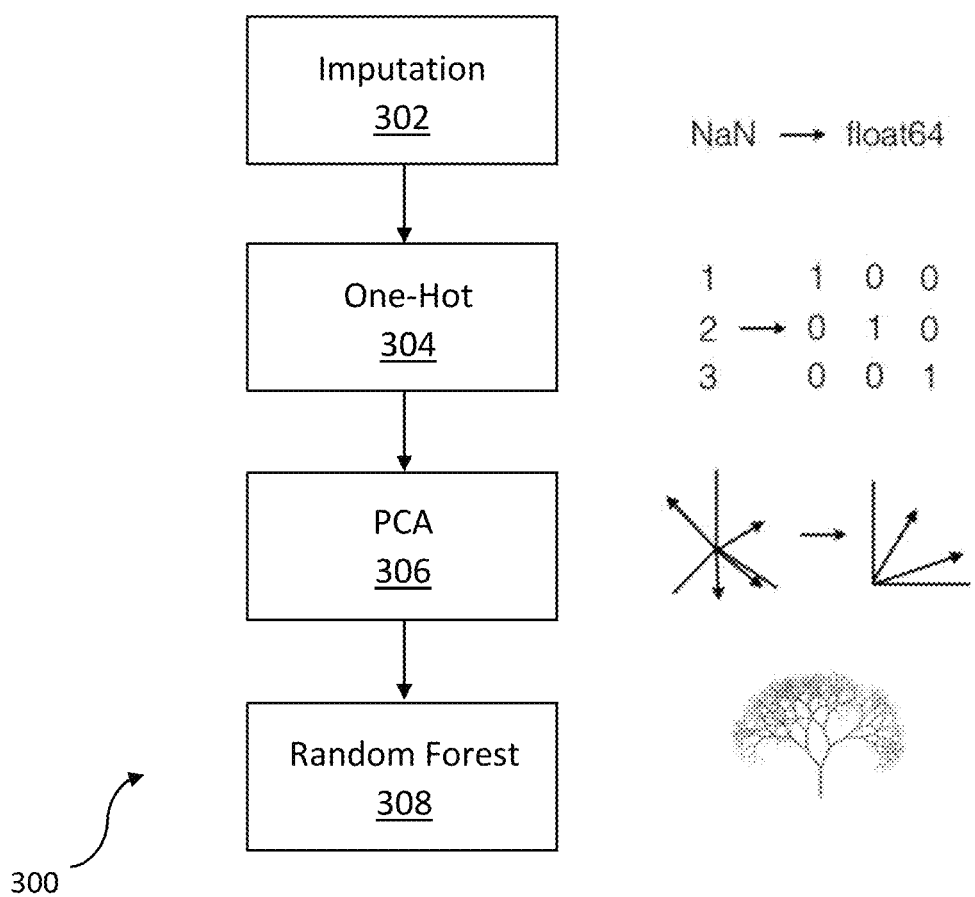
FIG. 3 depicts a flowchart of the step of training the classifier model of FIG. 1 in accordance with one embodiment.

The next step is to determine the model's accuracy by testing the model on the held-out data. This may be a cross-validation step based on k iterations to determine which model has the highest accuracy. Features of the present invention may use a random forest classification technique in step 308. This extends the decision tree classifier by applying multiple decision tree classifiers on random subsets of the training data, and then averaging each of their classifications. Although random forest techniques are shown in FIG. 3, it is contemplated that other machine learning procedures may be used to accomplish the various features of the invention.

Step 108 involves classifying new data. Once the classifier is trained, it may accept new, unlabeled input (i.e., new URIs), and assign a malicious or non-malicious designation to them. A designation of "unknown" or "inconclusive" may be assigned as well to indicate that a security researcher should research further. The designation can then be forwarded to another system for integration with another threat classification schema or to an end-user in the form of an alert notification for particular URIs identified as malicious.

Figure 4:
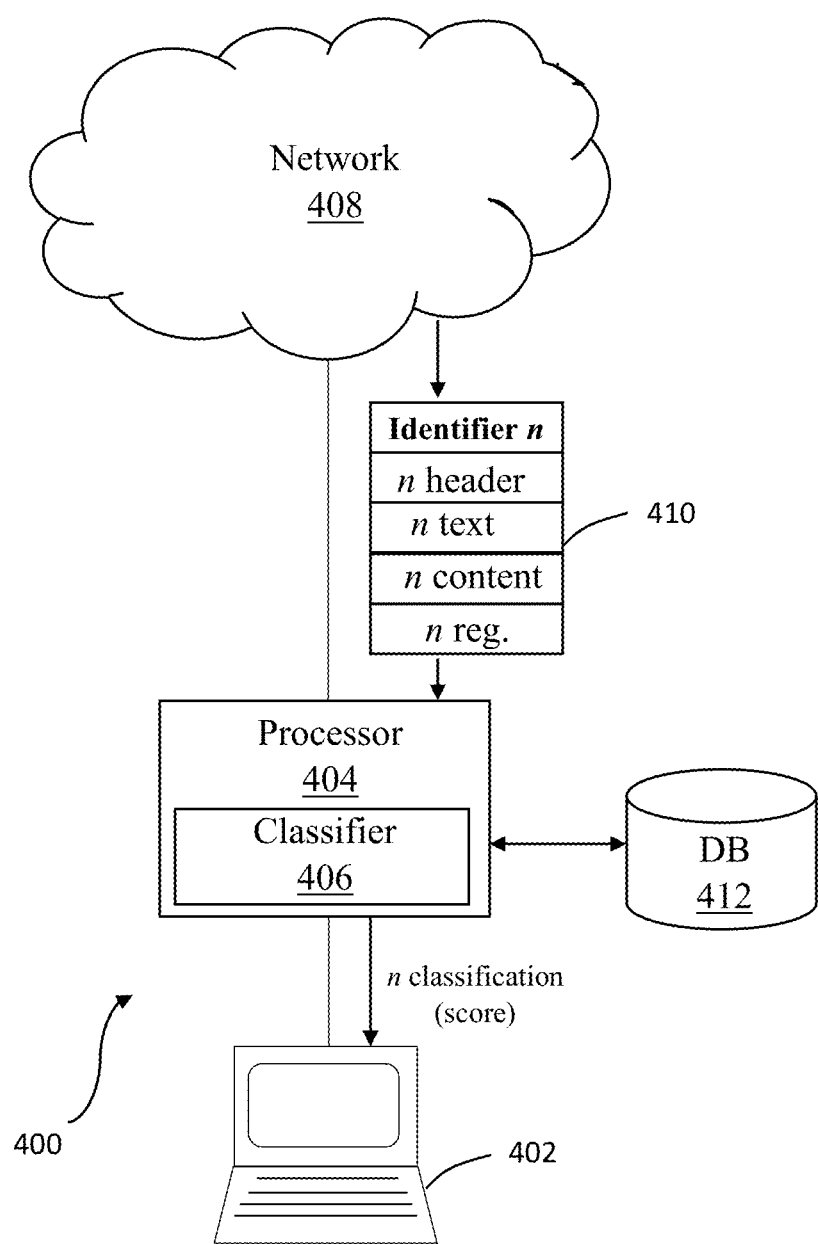
FIG. 4 illustrates a system for identifying malicious resources in accordance with one embodiment.

FIG. 4 presents a system 400 for identifying malicious resources in accordance with one embodiment. The system 400 may include an interface 402 to a computer-readable medium, a processor 404 with a classifier 406, and a communication network 408.

The user interface 402 may be implemented as a laptop, desktop, tablet, smartphone, or any other similar device that may be at risk of receiving and/or executing malicious resources.

The processor 404 may be any hardware device capable of executing the classifier 406 (such as the classifier 214 of FIG. 2) to classify a particular identifier as malicious or non-malicious. The processor 404 may be a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor 404 may be configured as part of the user interface 402 (e.g., a laptop) or may be located at some remote location. That is, the processing of the classifier 406 may be done on a server at a remote location, and the output of the classifier can be used to determine what is presented via the user interface 402, which is distinct from the server.

The network 408 may link various devices with various types of network accessible resources that may be accessed using URIs. The network 408 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network 408 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GS) link, a cellular digital packet data (CDPD) link, a Research in Motion, Limited (RIM) duplex paging type device, a Bluetooth radio link, or an IEEE 902.11-based link.

The exact type/configuration of the network 408 may vary as long as the processor 404 can analyze data (e.g., URIs, URLs) from the network 408. FIG. 4, for example, illustrates an identifier n 410 (e.g., a URI) being transmitted to the processor 404 for analysis.

As shown, the identifier n 410 may include text information, metadata information (e.g., header information), content information, and registration information, among other types of information, and is illustrated in more detail in FIG. 5. Information related to the text of identifier n 410 may include its length, number of vowels, number of consonants, number of special characters (e.g., !, ?, @, etc.), the identifier's file extension type, the number of domain levels, and the identifier's top-level domain.

The processor 404 may also request or receive additional information associated with the network-accessible resource reachable at the location specified in the identifier. For example, the processor 404 may issue a request for information to the resource associated with the identifier 410 via the network 408. The response to that request may take a two-part form: a header offering various parameters describing the network accessible resource and the form of its response to the request, as well as the content itself forming the response.

Information related to the header of the response may include a status code, an identification of the hardware implementing the network accessible resource, and the software implementing the network accessible resource.

Information related to the content of the response may include its header length, body length, various redirect instructions, etc.

Information related to the registration of the identifier may include ASN/DNS data and include, for example, IP characteristics and Autonomous System Membership information. Also shown in FIG. 5 is a blacklist check for identifier n 410. That is, this particular identifier n 410 may be checked against a known blacklist to at least assist in its classification.

The information shown in FIG. 5 is merely exemplary, and other types of information in addition to or in lieu of the information shown in FIG. 5 may be used in identifier classification. It is also noted that not every item of information shown in FIG. 5 is required to be used in classification, and a subset of such information may be used instead.

The identifier's classification may be expressed in terms of a score, with "1" indicating a high risk of maliciousness, and "0" indicating a low risk of maliciousness. The score may be expressed in terms of a number between 0 and 1 for internal computations (with 1 indicating a high risk of maliciousness, and 0 indicating a low risk of maliciousness), but may also be presented to a user in a variety of ways.

The score indicating a degree/risk of maliciousness may be scaled (e.g., 0-100, A-F) or expressed as a percentage, for example. Or, a score may be expressed in terms of a color (e.g., with red indicating a high risk of maliciousness and green indicating a low risk of maliciousness). The presentation of the risk score may be customized by a user based on their preferences.

Users may also customize subsequent actions based on their tolerance for the possibility a particular identifier is malicious. This tolerance may be translated into a number between 0 and 1 for internal computation purposes. For example, some users (or systems) may tolerate a certain degree of maliciousness, and users may customize the processor to only inform them (or perform some automated change to the system) if a particular identifier has an extremely high risk of being malicious.

The system 400 of FIG. 4 also includes at least one database 412 for storing information relating to processor execution and data training sets. The processor 404 may query the database 412 when necessary to retrieve information related to a particular feature and/or identifier, for example.

Figure 6:
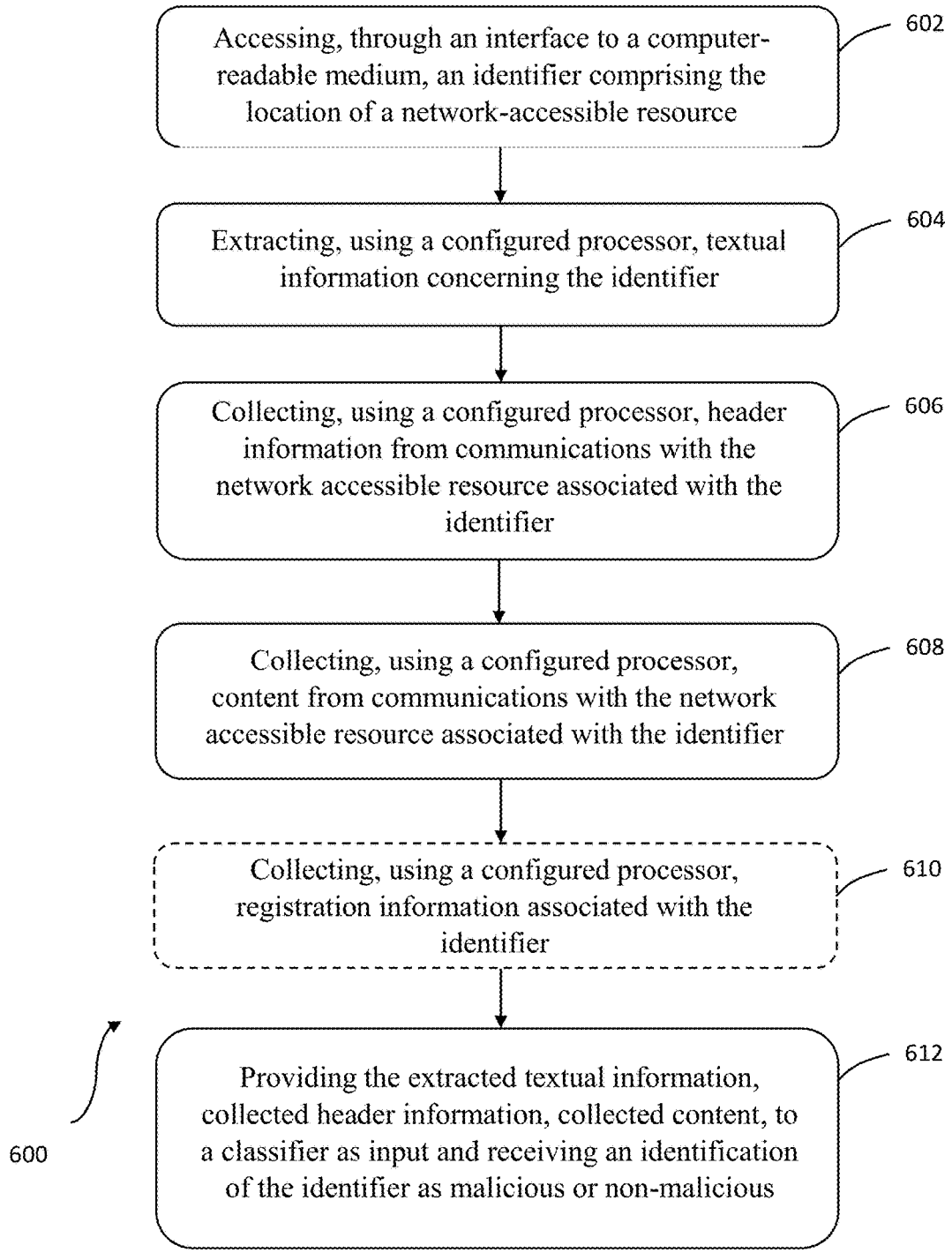
FIG. 6 depicts a flowchart of a method for identifying malicious resources in accordance with another embodiment.

FIG. 6 depicts a flowchart of a method 600 for identifying malicious resources in accordance with one embodiment. Step 602 involves accessing, through an interface to a computer-readable medium, an identifier comprising the location of a network-accessible resource. As mentioned previously, the interface may be implemented as a laptop, PC, tablet, smartphone, or the like. In this embodiment, the identifier may be a URI (or a URL), for example.

Step 604 involves extracting, using a configured processor, textual information concerning the identifier. As discussed above, the textual information may include, but is not limited to, the identifier's length, the number of words in the identifier, the number of vowels in the identifier, the number of consonants in the identifier, the number of special characters in the identifier, the file extension type of the identifier, the number of domain levels in the identifier, and the top-level domain the identifier.

Step 606 involves collecting, using a configured processor, metadata information from communications with the network accessible resource associated with the identifier. As discussed above, this metadata information may include, but is not limited to, header information, the identifier's status code, information related to server hardware associated with the resource specified in the identifier, and information related to the software serving content associated with the resource specified in the identifier.

Step 608 involves collecting, using a configured processor, content from communications with the network accessible resource specified in the identifier. As discussed above, the content information may include, but is not limited to, the content's head length, the content's body length, and any redirect instructions present in the content.

Step 610 involves collecting, using a configured processor, registration information (e.g., ASN/DNS data) associated with the identifier. The registration information may include, but is not limited to, IP characteristics and Autonomous System Membership information.

Step 612 involves providing the extracted textual information, the collected header information, and the collected content to a classifier as input. This classification may also be based on the collected registration information. The classifier may then classify the identifier as malicious or non-malicious based on the provided information. The identifier's classification (i.e., whether the identifier is malicious or non-malicious) may then be communicated to the processor for subsequent action.

Figure 7:
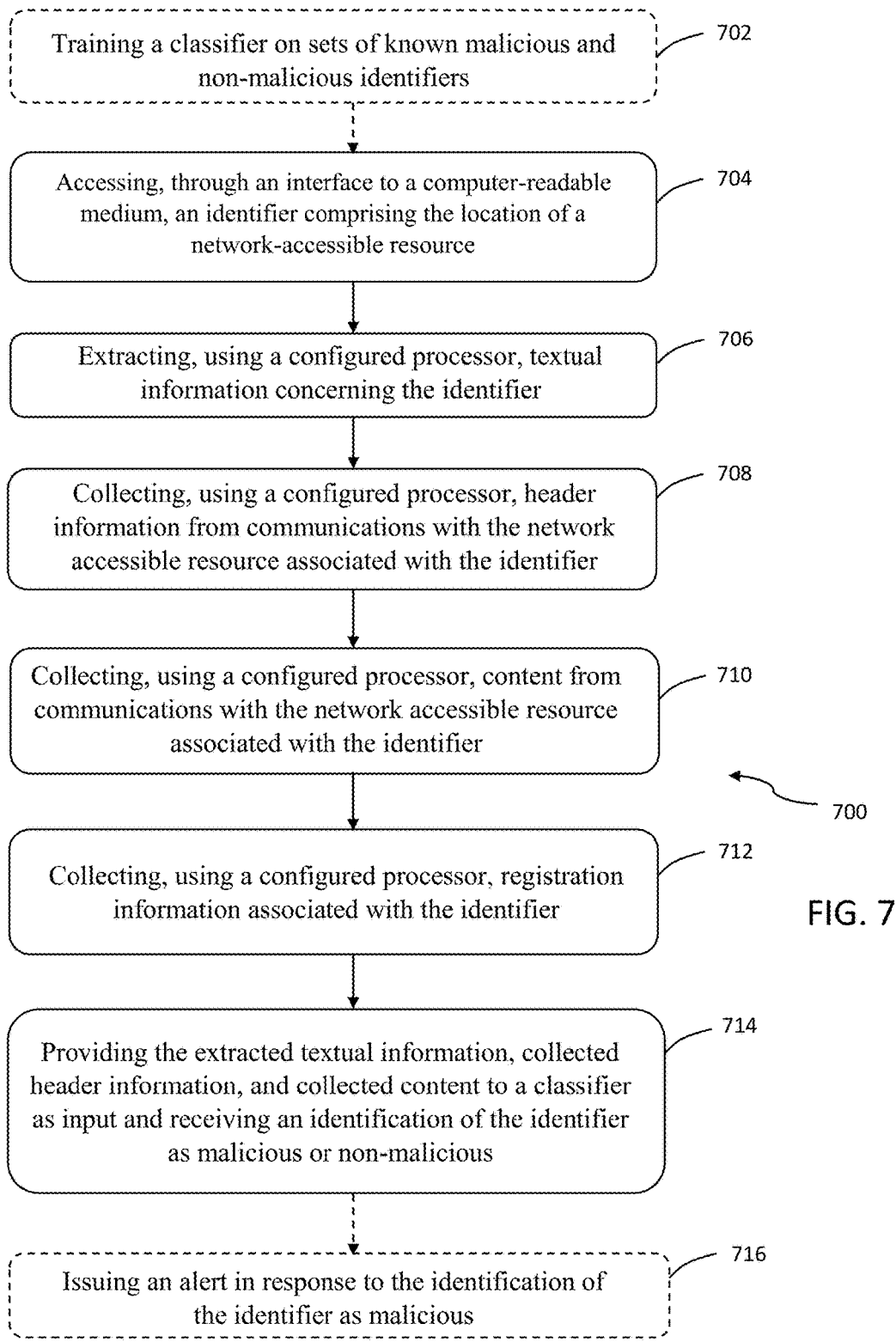
FIG. 7 depicts a flowchart of a method for identifying malicious resources in accordance with yet another embodiment.

FIG. 7 depicts a flowchart of a method 700 for identifying malicious resources in accordance with another embodiment. Step 702 involves training a classifier on sets of known malicious and non-malicious identifiers. The classifier may receive a set of identifiers such as URIs (or a table with multiple fields, with one field containing URIs and is labeled as such). A series of subroutines may then be executed to collect features relating to the training identifiers. Exemplary features are illustrated in FIG. 2.

Then, a supervised machine learning procedure may be applied to the labeled training data such as those procedures discussed previously. Once trained, the classifier may then accept new data for classification and in real time. Additionally, a database may be repeatedly updated with new data and classifications to assist the classifier in future classifications.

Steps 704, 706, 708, 710, 712, and 714 of FIG. 6 are similar to steps 602, 604, 606, 608, 610, and 612 of FIG. 6, respectively, and are not repeated here. Step 716 involves issuing an alert in response to the identification of an identifier as malicious. That is, if a particular identifier is classified as malicious, an alert to that effect may be issued to a user or another system. Therefore a user will know that a particular identifier (e.g., a link) is malicious and should not click on the link. This alert may be communicated to a user in a variety of ways such as through visual means, auditory means, haptic-based means, or any combination thereof.

In other embodiments, other actions may be taken in response to the classification of an identifier as malicious. For example, the computer may block network communications with the network-accessible resource contained in a malicious identifier.

The classifier's outputs may be used to generate blacklists of malicious identifiers that may be provided to other computers to prevent the operators of those other computers from accessing identifiers on the blacklist. A trained classifier may itself be provided to other computers which may use the classifier to evaluate identifiers as malicious or non-malicious in real-time.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for identifying malicious resources accessible through a network, the method comprising:
    providing a labeled dataset of malicious identifiers and non-malicious identifiers to a classifier, wherein the labeled dataset includes at least one descriptive feature associated with each of the malicious identifiers and non-malicious identifiers;
    identifying at least one probabilistic pattern among the at least one descriptive feature;
    developing, using the classifier, a decision boundary between the malicious identifiers and non-malicious identifiers based on the at least one identified probabilistic pattern;
    accessing, through a medium interface to a computer-readable medium, an accessed identifier comprising the location of a network accessible resource;
    extracting, using a configured processor, textual information concerning the accessed identifier accessed by the medium interface;
    collecting, using the configured processor, metadata information from communications with the network accessible resource associated with the accessed identifier;
    collecting, using the configured processor, content from communications with the network accessible resource associated with the accessed identifier; and
    providing the extracted textual information, collected metadata information, and collected content to the classifier as input, and receiving an identification of the accessed identifier as malicious or non-malicious based on a comparison of the provided textual information, metadata information, and collected content with the developed decision boundary.

2. The method of claim 1 wherein developing the decision boundary includes:
    organizing the at least one descriptive feature into a binary tree; and
    selecting at least one feature to identify the at least one probabilistic pattern based on gini entropy.

3. The method of claim 1, wherein the accessed identifier is a uniform resource identifier (URI).

4. The method of claim 1, further comprising collecting, using a network interface, information concerning the presence of the accessed identifier on a blacklist, and providing the collected blacklist presence information to the classifier.

5. The method of claim 1, further comprising issuing an alert in response to the accessed identification of the identifier as malicious.

6. The method of claim 1, wherein the textual information is at least one of length, number of vowels, number of consonants, number of special characters, file extension type, number of domain levels, and top-level domain.

7. The method of claim 1, wherein the accessed identification of the accessed identifier comprises a score to define a degree of maliciousness of the identifier.

8. The method of claim 7, wherein at least one of whether the score is presented to a user based on the degree of maliciousness and how the score is presented to a user is customizable.

9. The method of claim 1, wherein the metadata information is at least one of a status code, the identity of a hardware providing the network accessible resource, and the identity of a software serving the content.

10. The method of claim 1, wherein the content is at least one of head length, body length, and redirect instructions.

11. The method of claim 1, further comprising collecting, using a configured processor, registration information associated with the accessed identifier.

12. A system for identifying malicious resources accessible through a network, the system comprising:
    a medium interface to a computer-readable medium configured to access an accessed identifier comprising the location of a network accessible resource;
    a network interface;
    a processor in communication with the medium interface and the network interface, the processor including a classifier to:
        receive a labeled dataset of malicious identifiers and non-malicious identifiers, wherein the labeled dataset includes at least one descriptive feature associated with each of the malicious identifiers and non-malicious identifiers,
        identify at least one probabilistic pattern among the at least one descriptive feature, and
        develop a decision boundary between the malicious identifiers and non-malicious identifiers based on the at least one identified probabilistic pattern;
    wherein the processor is further configured to:
        extract textual information concerning the accessed identifier accessed by the medium interface;
        collect metadata information from communications with the network accessible resource associated with the accessed identifier;
        collect content from communications with the network accessible resource associated with the accessed identifier; and
        execute the classifier receiving the extracted textual information, collected metadata information, and collected content as inputs and providing an identification of the accessed identifier as malicious or non-malicious as output, wherein the identification is based on a comparison of the provided textual information, metadata information, and collected content with the developed decision boundary.

13. The system of claim 12, wherein the classifier develops the decision boundary by:
   organizing the at least one descriptive feature into a binary tree; and
   selecting at least one feature to identify the at least one probabilistic pattern based on gini entropy.

14. The system of claim 12, wherein the accessed identifier is a uniform resource identifier (URI).

15. The system of claim 12, wherein the network interface is further configured to collect information concerning the presence of the accessed identifier on a blacklist, and providing the collected blacklist presence information to the classifier.

16. The system of claim 12, further comprising an alert device to issue an alert in response to the identification of the accessed identifier as malicious.

17. The system of claim 12, wherein the textual information is at least one of length, number of vowels, number of consonants, number of special characters, file extension type, number of domain levels, and top-level domain.

18. The system of claim 12, wherein the accessed identification of the identifier comprises a score to define a degree of maliciousness of the accessed identifier.

19. The system of claim 18, wherein at least one of whether the score is presented to a user based on the degree of maliciousness and how the score is presented to a user is customizable.

20. The system of claim 12, wherein the metadata information is at least one of a status code, the identity of a hardware providing the network accessible resource, and the identity of a software serving the content.

21. The system of claim 12, wherein the content is at least one of head length, body length, and redirect instructions.

22. The system of claim 12, wherein the processor is further configured to collect registration information associated with the accessed identifier.

23. A non-transitory computer-readable medium containing computer-executable instructions for performing a method for identifying malicious resources accessible through a network, the medium comprising:
   computer-executable instructions for providing a labeled dataset of malicious identifiers and non-malicious identifiers to a classifier, wherein the labeled dataset includes at least one descriptive feature associated with each of the malicious identifiers and non-malicious identifiers;
   computer-executable instructions for identifying at least one probabilistic pattern among the at least one descriptive feature;
   computer-executable instructions for developing, using the classifier, a decision boundary between the malicious identifiers and non-malicious identifiers based on the at least one identified probabilistic pattern;
   computer-executable instructions for accessing, through a device interface to a programmable device, a text for analysis;
   computer-executable instructions for accessing, through a medium interface to a computer-readable medium, an accessed identifier comprising the location of a network accessible resource;
   computer-executable instructions for extracting, using a configured processor, textual information concerning the accessed identifier;
   computer-executable instructions for collecting, using the configured processor, metadata information from communications with the network accessible resource associated with the accessed identifier;
   computer-executable instructions for collecting, using the configured processor, content from communications with the network accessible resource associated with the accessed identifier; and
   computer-executable instructions for providing the extracted textual information, collected metadata information, and collected content to a classifier as input and receiving an identification of the accessed identifier as malicious or non-malicious based on a comparison of the provided textual information, metadata information, and collected content with the developed decision boundary.

24. The non-transitory computer-readable medium of claim 23, further comprising computer-executable instructions for training the classifier on sets of known malicious and non-malicious identifiers.

* * * * *